Figure 1:
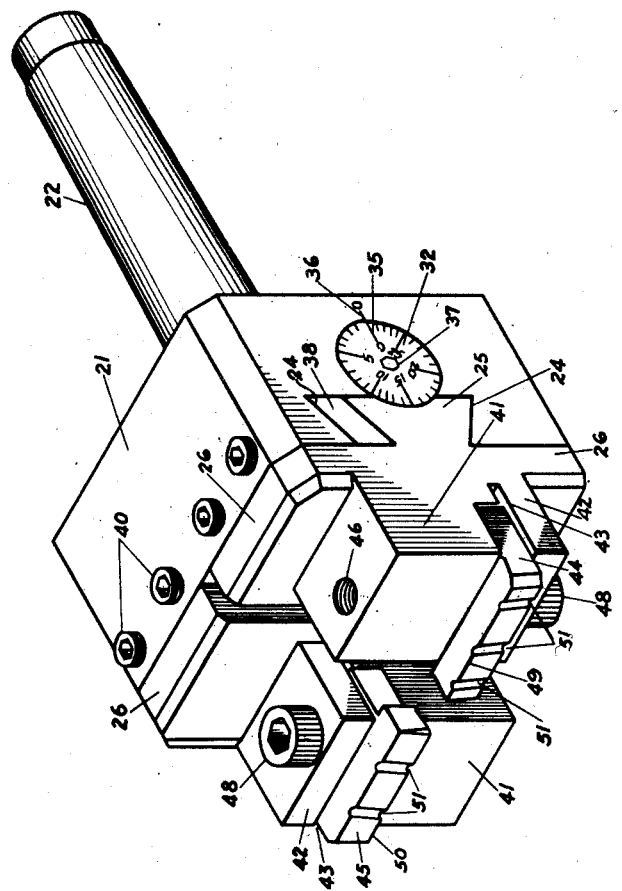

June 25, 1946.	A. J. MAFFIA	2,402,650
ADJUSTABLE CUTTER HEAD
Filed March 23, 1945	2 Sheets-Sheet 1

INVENTOR.
Anthony J. Maffia
BY
Ralph Chappell
ATTORNEY.

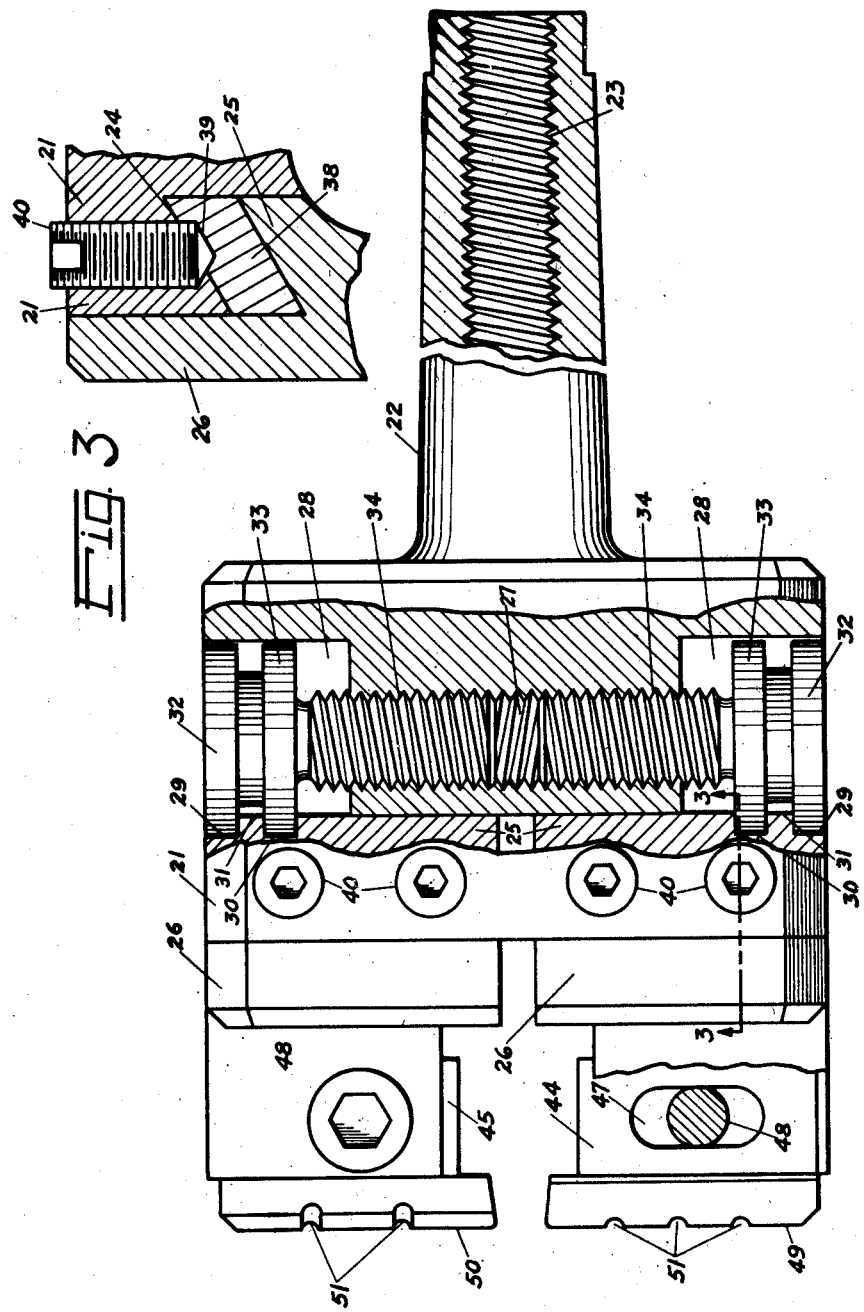

Patented June 25, 1946

2,402,650

UNITED STATES PATENT OFFICE 2,402,650

ADJUSTABLE CUTTER HEAD

Anthony J. Maffia, New York, N. Y.

Application March 23, 1945, Serial No. 584,475

3 Claims. (Cl. 29—97)

(Granted under the act of March 3, 1883, as amended April 30, 1928; 370 O. G. 757)

This invention relates to a cutting tool head useful in machining operations.

An example of the many operations which may be performed by this device is the machining of projections or tenons, such as the machining of cylindrical tenons upon the ends of turbine blades. It will be apparent to those skilled in the art, however, that many types of machining operations may be performed by the use of this device, depending upon the type of cutting blade inserted in the cutting tool head and upon the motion imparted to the cutting tool head or to the work.

In machining operations in which a high degree of accuracy is necessary, such as the machining of turbine blades, the use of an ordinary cutting tool head requires long and tedious operations by a skilled mechanic and involves many trial cuts and measurements.

An object of the present invention, therefore, is to provide a cutting tool head for machining operations which enables the work to be speedily and accurately accomplished with a minimum of operations.

Another object is to provide a cutting tool head in which the cutting tool means are micrometrically adjustable to a predetermined position with respect to the work.

A still further object is to provide means for locking the cutting tool means in any of said predetermined and adjusted positions.

Further objects and advantages of this invention, as well as its construction, arrangement and operation, will be apparent from the following description and claims in connection with the accompanying drawings, in which, Figure 1 is an isometric projection of the cutting tool head of this invention;

Figure 2 is a top plan view of the device of Figure 1 partially in section, to show certain of the operating parts thereof, and Figure 3 is a sectional spot view taken on the line 3—3 of Figure 2.

Referring to the drawings in detail, 21 represents the cutting tool head of this invention and having a supporting means therefor, comprising a tapered shank 22 which is bored and internally threaded as at 23, and is adapted to be inserted into the head or tail spindle of a lathe, drill press, or other similar machine.

The head 21 contains a mortised groove 24 extending completely across its forward face for slidably receiving a pair of tongue members 25 of tool holders 26, and is further provided with a threaded bore 27 approximately through its center and parallel to said mortised groove 24. Counterbores 28 of larger diameter are provided at each end of the bore 27 openly communicating with the inner face of the groove 24 for a purpose to be described below.

The tool holders 26 are snugly but movable mounted upon the head 21 with the tenons or tongue members 25 engaging the mortised groove 24. The inner end face of each tenon or tongue member 25 contains two spaced annular segmental grooves 29 and 30 having a raised lip or rib 31 there-between for engaging the annular head 32 and adjacent collar 33 of the micrometer screw 34 residing in the corresponding counterbore 28 and threadedly engaging the threaded bore 27. The micrometer heads 32 and collars 33 are of approximately the same diameter as the counterbores 28 and fit snugly therein. The micrometer heads 32 reside partially in the grooves 29 and the collars 33 reside partially in the grooves 30 of the tenons or tongue members 25. When either one of the micrometer screws 34 is turned the lip or rib 31 is engaged and the corresponding tool holder 26 and its assembly is correspondingly moved.

The outer exposed faces of the micrometer heads 32 are suitably graduated as at 35 and a reference guiding mark is placed on each side of the head 21 as at 36. When the zero marks on the micrometer heads 32 are lined up with the reference marks upon the head 21, the tool holders 26 are exactly flush with the sides of the head 21. The marks on the micrometer heads 32 and the pitch of the screw thread are correlated as desired. It has been found desirable in general machining work to correlate them so that each time one of the micrometer screws 34 is rotated the distance between two consecutive marks on the micrometer head 32, the corresponding tool holder 26 moves .001 inch.

The graduated faces 35 of the screws 34 are each provided with a centrally located socket hole 37 for the insertion of a socket wrench, not shown, so that the screws 34 and associated assemblies may be accurately adjusted to any desired setting for machining operations.

Interposed between each tenon or tongue member 25 of the tool holders 26 and snugly fitted between the inner top surface of the tenons or tongue members 25 and the upper inner surface of the mortised grooves 24 is a pressure bearing plate 38, one such shown in an enlarged sectional view in Figure 3. These pressure bearing plates 38 are drilled as at 39 for receiving the spaced ends of the pairs of set screws 40 extending through the top of the head 21. There are preferably two set screws 40 to each pressure bearing plate 38. By screwing down the set screws 40 pressure is applied to the pressure bearing plates 38 and to the underlying tenons or tongue members 25, so that the tool holders 26 are therefore tightly clamped in place and firmly secured against motion relative to the head 21. When it is necessary to adjust the tool holders 26 relative to the work, the set screws 40 are loosened only to such an extent that the pressure is released upon the plates 38. The ends of the set screws 40 remain in the depressed portions 39 and hold the pressure bearing plates 38 stationary as the members 25 and 26 are moved.

The tool holder assemblies 26 embody a vise type construction having a block-like stationary jaw 41 and a yieldable extension plate 42 providing a slot or opening 43 for the insertion and holding of suitable cutting tools 44 and 45. In each tool holder 26 a bore 46 extends vertically through said plate 42 and jaw 41 and is preferably threaded in the section extending through the stationary jaw 41. The cutting tools 44 and 45 contain slots 47 of approximately the same width as the diameter of the bore 46 and in line with the said bore when the tool is properly positioned. Socket headed cap screws 48 are provided to pass through the bores 46 of the yieldable plates 42 and through the slots 47 provided in the body of the cutting tools and threadedly engage the threaded sections of the bores 46 in the stationary jaws 41. When the cap screws 48 are drawn up, the cutting tools 44 and 45 will be tightly clamped between the stationary jaws 41 and the yieldable plates 42 of the tool holders 26, respectively. The elongated slots 47 permit the cutting tools to be adjusted laterally with respect to the tool holder 26 when the cap screws 48 are loosened.

The tool holder assemblies 26 are identical in function but are so arranged in the head 21 that the cutting edges of the cutting tools are oppositely disposed. The cutting edge 49 of the tool 44 is shown facing upward while the cutting edge 50 of the tool 45 is shown facing downward. The slots or openings 43 in the tool holders 26 are so positioned with respect to each other that the cutting edges 49 and 50 of the cutting tools 44 and 45 may be adjusted and maintained in the same longitudinal plane with respect to the work being machined by said tools.

The cutting tools 44 and 45 are provided with grooves 51 in their cutting faces to enable a heavier cut to be taken. Three grooves 51 are shown in the cutting tool 44 while two similar grooves 51 are shown in the cutting tool 45, however, the cutting faces may contain any number of such grooves provided they do not register or be spaced alike on the two cutters. A finely machined and plane surface will result as the work or the head rotates, as the case may be, the ridges left by one cutting tool being cut off by the other cutting tool as they progress across or around the work. In some machine operations, however, it may not be desirable to use a cutting blade containing such grooves.

In operation, for example, in the machining of cylindrical tenons, the cutting tool head is mounted either in the rotating head or the fixed head of a lathe, drill press or other similar machine. The work to be operated upon is mounted in the opposite head. The micrometer screws 34 are set on the zero mark 36, the tool holders 26 locked in position by drawing up set screws 40, and the cutting tools 44 and 45 are preliminarily adjusted by loosening cap screws 48 and tapping the tools 44 and 45 to the desired setting. When the cutting tools 44 and 45 are adjusted to approximately the correct position the cap screws 48 are drawn tight. A trial cut is now made and the diameter of the resulting tenon is measured. The amount of error is determined and the necessary correction is made by loosening the set screws 40 and turning the micrometer screws 34. If for example, the trial cut was .020 inch oversize, each of the micrometer screws 34 is rotated until the 10 mark on the micrometer head 32 is opposite the reference mark 36 on the head 21. The cutting tools 44 and 45 are then .020 inch closer together and are locked in this position by tightening set screws 40. After this adjustment, the final cut may be made in one operation. Succeeding pieces of work of similar measurement may be machined without further adjustment or attention. Any adjustment necessary is obtained by simply turning the micrometer screws 34.

By means of the device described the work formerly required in adjusting the cutting tools has been reduced to a minimum, the machining operation has been greatly speeded up, and the work may be done by relatively unskilled operators.

It is to be understood that various modifications and changes may be made in this invention without departing from the spirit and scope thereof.

The invention described herein may be manufactured and used by or for the Government of the United States of America for governmental purposes without the payment of any royalties thereon or therefor.

What is claimed is:

1. A device for machining operations comprising a cutting tool head having support means therefor, a pair of tool holders movably mounted on the said head, cutting tool means adjustably positioned in each tool holder, micrometer adjusting means associated with each tool holder for predeterminately adjusting each of said tool holders with respect to the work independently of each other, and locking means for selectively locking each of the said tool holders in the said predetermined position.

2. A device for machining operations comprising a cutting tool head having support means therefor, a pair of tool holders movably mounted upon the said head on the opposite side of the said head from the said support means, cutting tool means adjustably positioned in each tool holder, the cutting edges of the said cutting tool means in the said pair of tool holders being approximately in the same longitudinal plane but oppositely disposed with respect to each other, means for securing the cutting tool means in the adjusted position with respect to the said tool holder, micrometer adjusting means associated with each tool holder for predeterminately adjusting the said tool holder with respect to the work, locking means associated with each tool holder for locking the said tool holder in the said predetermined position, and a pressure bearing plate interposed between the said locking means and the said tool holder.

3. A device for machining operations comprising a cutting tool head having support means therefor, a pair of tool holders movably mounted upon the said head, cutting tool means positioned in each tool holder, micrometer adjusting means associated with each tool holder for predeterminately adjusting each of said tool holders with respect to the work independently of each other, locking means associated with each tool holder for locking the said tool holder in said predetermined position, and a pressure bearing plate interposed between said locking means and said tool holder.

ANTHONY J. MAFFIA.